United States Patent
Kent

[15] 3,680,282
[45] Aug. 1, 1972

[54] GAS SCRUBBER

[72] Inventor: Roger E. Kent, Mt. Prospect, Ill.

[73] Assignee: National Dust Collector Corporation, Skokie, Ill.

[22] Filed: May 28, 1970

[21] Appl. No.: 41,247

Related U.S. Application Data

[63] Continuation-in-part of Ser. No. 809,231, March 21, 1969, abandoned.

[52] U.S. Cl. ............55/233, 55/257, 55/496, 55/502, 55/512, 261/98
[51] Int. Cl. .............................B01d 47/04
[58] Field of Search........55/496, 502, 233, 512, 257, 55/490; 261/94-107; 210/291, 293, 455, 477

[56] References Cited

UNITED STATES PATENTS

| | | | |
|---|---|---|---|
| 2,307,938 | 1/1943 | Mathias | 261/99 |
| 3,348,364 | 10/1967 | Henby | 261/98 |
| 1,481,122 | 1/1924 | Cleworth | 261/113 |
| 2,160,549 | 5/1939 | Kurth | 261/98 |
| 2,274,041 | 2/1942 | Cook et al. | 261/114 |
| 2,545,651 | 3/1951 | Cummings | 261/114 |
| 2,645,304 | 7/1953 | McIlvaine | 261/95 |
| 2,973,189 | 2/1961 | Chu | 202/158 |
| 3,348,825 | 10/1967 | McIlvaine | 55/257 |

FOREIGN PATENTS OR APPLICATIONS

| | | | |
|---|---|---|---|
| 623,295 | 1963 | Belgium | 55/490 |

*Primary Examiner*—Bernard Nozick
*Attorney*—Mason, Kolehmainen, Rathburn and Wyss

[57] ABSTRACT

A wet-type gas scrubber comprising a housing having an inlet for contaminated gas and an outlet for cleansed gas spaced above said inlet, means for wetting said gas with scrubbing liquid, first means between said inlet and outlet for accelerating said wetted gas to high velocity and forming a bed or layer of liquid foam bubbles across said housing between said inlet and outlet. Second means is provided for varying the thickness of said foam layer across said housing, thereby obtaining a substantially uniform gas velocity through the foam layer throughout the flow cross section of the foam bed.

11 Claims, 9 Drawing Figures

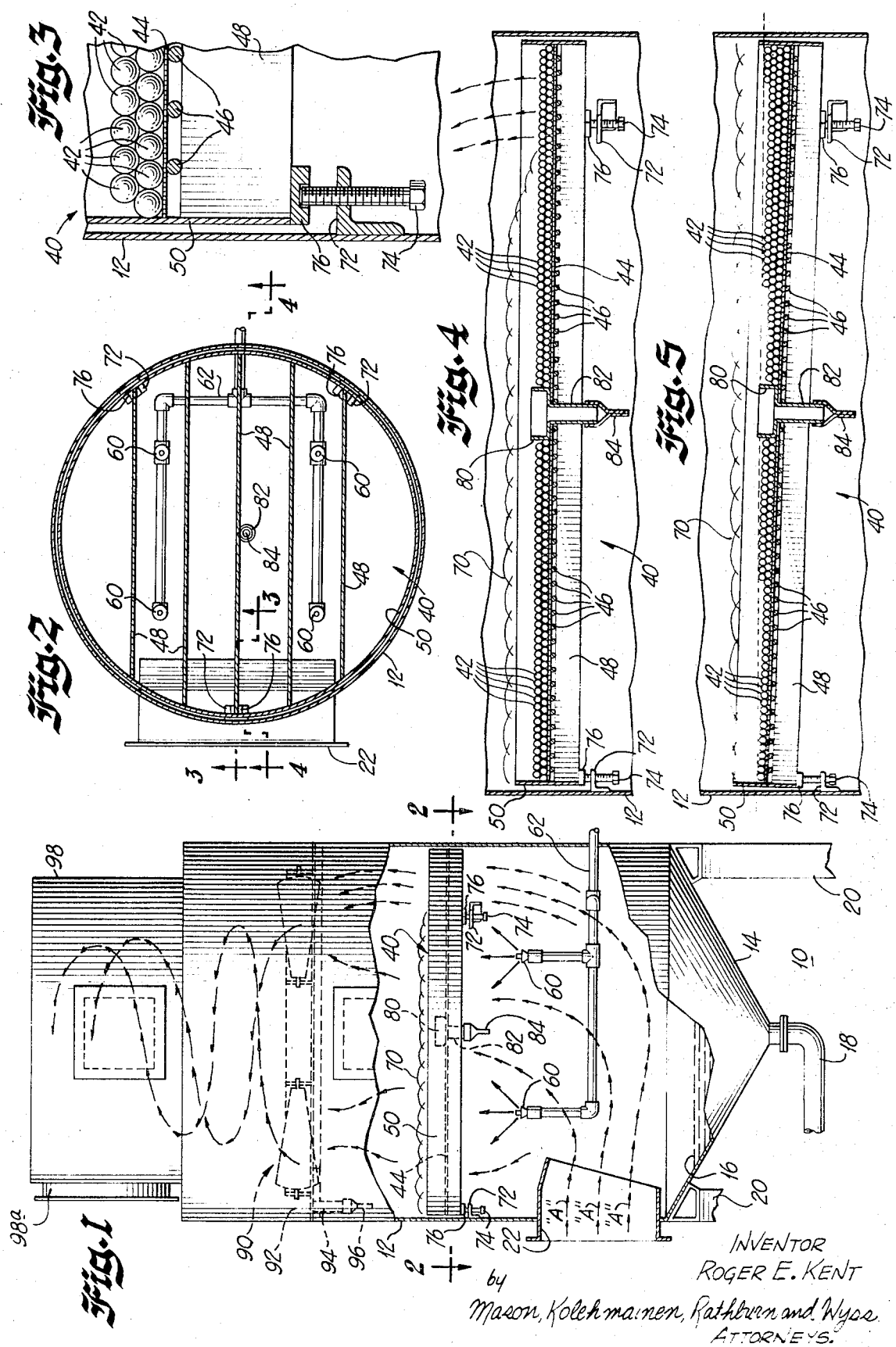

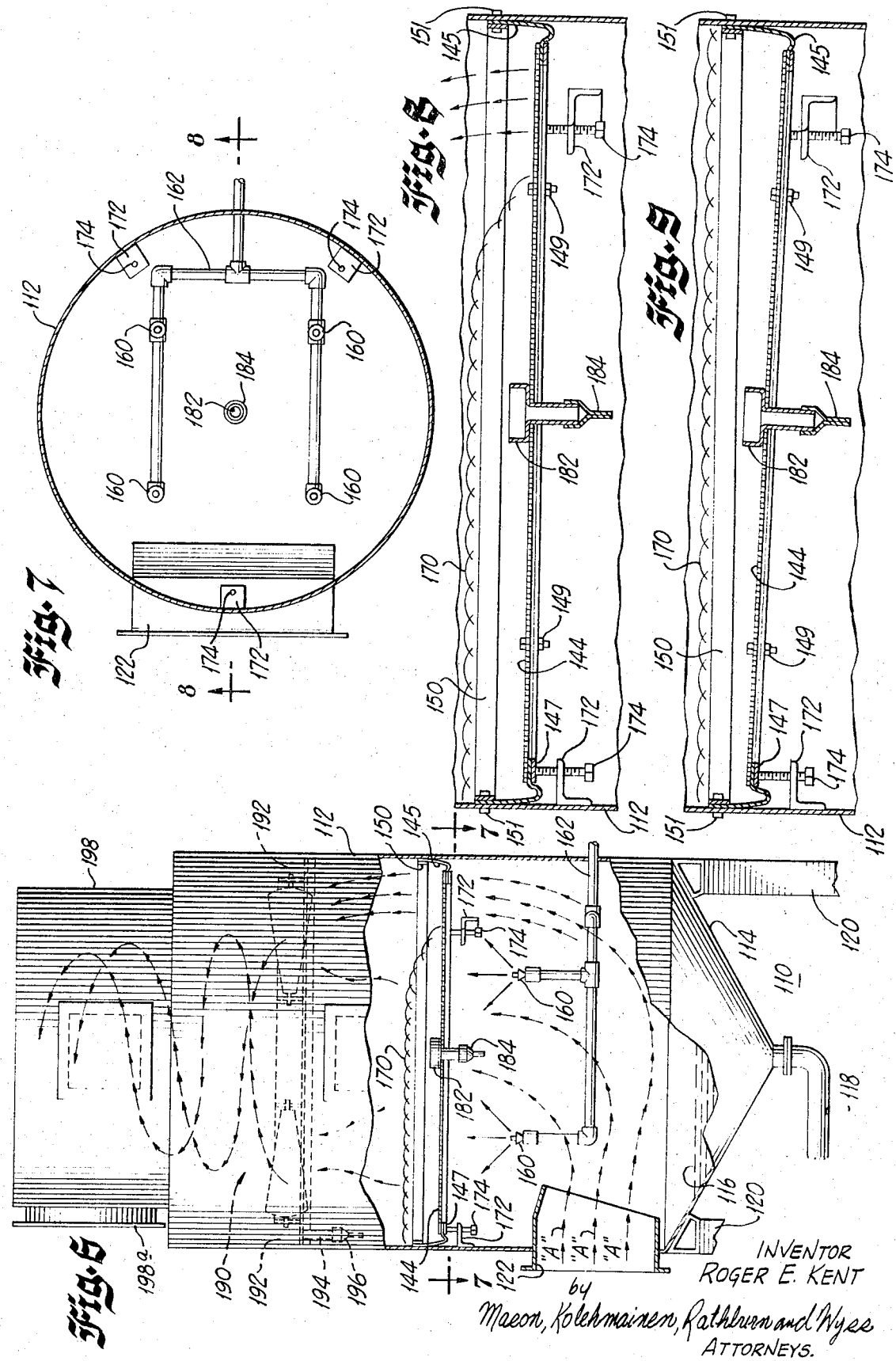

GAS SCRUBBER

This application is a continuation-in-part of the copending United States Pat. application Ser. No. 809,231, filed Mar. 21, 1969 now abandoned, and assigned to the same assignee.

The present invention relates to a new and improved gas scrubber and, more particularly, to a new and improved wet-type gas scrubbing apparatus wherein scrubbing liquid is used for collecting and removing contaminant particles and fumes from industrial gases, and the like, by passage of the gases through a layer or bed of foam bubbles. The gas scrubber of the present invention is an improvement over the apparatus described and claimed in the United States Pat. No. 2,649,924, wherein scrubbing action is obtained as the contaminated gases are passed through one or more filter beds wherein the particles in the gas are entrapped within the liquid which is then separated from the gas.

One of the problems occurring in dust collectors of the prior art is that a nonuniform gas velocity distribution over the cross-sectional flow area of the filter bed sometimes causes high velocity gas flow or channeling to develop in a particular section of the filter bed. When such channeling occurs, some of the contaminated gases pass upwardly through the system without adequate scrubbing action, and this results in a low particle removal efficiency in the scrubber.

In accordance with the present invention, means are provided for generating a layer or bed of foam bubbles through which the gas is passed. The upper level of the foam layer tends to remain horizontal even though the means for generating the foam bed, such as a supporting grid structure, and filter elements or perforated plate may be tilted relative to the horizontal. The depth or thickness of the foam layer is varied over the cross section of the scrubber and is adjusted to be deeper in the particular region where the most severe channeling occurs. In these regions in the foam layer where the gas velocity is too high and destroys the foaming action, the increased thickness of the foam bed helps redistribute the velocity more uniformly.

It is an object of the present invention to provide a new and improved wet-type gas scrubber employing a layer of foam bubbles through which the contaminated gases pass.

Another object of the present invention is to provide a new and improved gas scrubber of the character described wherein channeling action in the foam layer is eliminated.

Another object of the present invention is to provide a new and improved gas scrubber of the character described wherein a relatively uniform average gas velocity is established throughout the foam layer across the whole flow area thereof.

A further object of the present invention is to provide a new and improved gas scrubber of the character described wherein the gas flow is distributed more evenly across the whole cross-sectional flow area of the foam bed or layer.

Another object of the present invention is to provide a new and improved gas scrubber of the character described wherein a more uniform foam bed and foaming action is achieved over the entire cross-sectional flow area of the bed.

More specifically, it is another object of the present invention to provide a new and improved filter bed for a gas scrubber of the character described including adjustable support grid means movable relative to the horizontal and a plurality of independent, movable filter elements supported thereon. Yet another object of the present invention is to provide a new and improved gas scrubber employing a perforated plate for generating a foam bed and means for tilting the perforated plate relative to the horizontal to establish a foam bed or layer having differing thicknesses over the cross section thereof.

The foregoing and other objects and advantages of the present invention are accomplished by the provision of a new and improved wet-type gas scrubber comprising a housing having an inlet for contaminated gas and an outlet for cleansed gas spaced above said inlet. Means is provided for wetting the gas with scrubbing liquid and first means is provided for accelerating the wetted gas to high velocity forming a layer of liquid foam bubbles across the housing between the inlet and outlet through which the contaminated gas passes. Second means is provided for varying the thickness of the foam layer at different areas in the housing and locating the areas in a desired manner in order to obtain a substantially uniform average gas velocity throughout the entire cross section of the foam layer.

For a better understanding of the present invention, reference should be had to the following detailed description taken in conjunction with the drawings, in which:

FIG. 1 is a side elevational view with portions broken away of one embodiment of a new and improved gas scrubber constructed in accordance with the present invention;

FIG. 2 is a transverse cross-sectional view of the scrubber taken substantially along line 2—2 of FIG. 1;

FIG. 3 is an enlarged, fragmentary, vertical, sectional view taken substantially along line 3—3 of FIG. 2;

FIG. 4 is a fragmentary, vertical, sectional view taken substantially along line 4—4 of FIG. 2, illustrating the filter bed supporting grid in a substantially horizontal position;

FIG. 5 is a fragmentary sectional view similar to FIG. 4 but illustrating the filter bed in a tilted position relative to the horizontal in order to accommodate a nonuniform velocity distribution of the gas flowing upwardly in the housing of the scrubber.

FIG. 6 is a side elevational view with portions broken away and in section of another embodiment of a new and improved gas scrubber constructed in accordance with the features of the present invention;

FIG. 7 is a transverse cross-sectional view of the scrubber taken substantially along line 7—7 of FIG. 6;

FIG. 8 is a fragmentary, vertical, sectional view taken substantially along line 8—8 of FIG. 7 and illustrating foam layer forming means in the scrubber in a substantially horizontal position with channeling occurring therein; and FIG. 9 is a fragmentary sectional view similar to FIG. 8, but illustrating the foam layer forming means in a tilted position relative to the horizontal for eliminating channeling action and providing a substantially uniform velocity distribution across the layer of foam developed in the scrubber.

Referring now more particularly to the drawings, in FIGS. 1–5 therein is illustrated one embodiment of a new and improved gas scrubber 10 constructed in accordance with the features of the present invention, and especially adapted for collecting and removing particles and fumes from industrial gases and the like. The scrubber 10 includes an upstanding, generally cylindrical housing section 12 having a conically shaped bottom wall 14 at the lower end which forms a liquid sump 16 for receiving contaminated scrubbing liquid containing the contaminants removed from the gases. The liquid in the sump 16 is maintained at a relatively constant height or level and the liquid is drained from the sump through an outlet drain line 18 which leads to a treatment system or sewer.

The scrubber 10 is supported on a plurality of legs 20 and the contaminated gases to be cleaned are introduced into the lower end of the scrubber housing 12 through an inlet fitting 22 which extends through one side of the housing wall and directs the gas flow slightly downwardly toward the surface of the liquid in the sump 16, as indicated by the flow arrows "A" (FIG. 1). The incoming gases pass across the scrubbing liquid in the sump 16 and then flow upwardly in a generally vertical direction toward the upper end of the housing. Because the inlet fitting 22 is on one side of the housing and because the gas velocity in the fitting is not generally uniform across the entire flow cross section thereof, the velocity of the gas flowing upwardly in the housing 12 is likewise not uniform at all points in the circular cross-sectional flow area of the housing 12. Although, on the average, the gas flow velocity in the housing 12 is considerably lower than the gas velocity in the inlet duct 22 because of the larger cross-sectional flow area of the housing, the velocity in certain areas or regions may be too high to support good foaming action and channeling will occur. In cases where the inlet fitting 22 is supplied from an inlet duct which is not reasonably straight for a length of approximately eight diameters before the point of attachment with the fitting, the gas felocity across the flow cross section of the inlet fitting is almost always nonuniform and widely divergent in value and direction. Accordingly, in such instances, the upward gas velocity in the housing 12 is likewise nonuniform in direction and velocity and varies widely from place to place in the cross section so that channeling of the gases through a small portion of the filter bed is likely to occur.

In accordance with the present invention, the gas scrubber 10 includes a filter bed 40, best shown in FIGS. 2 through 5, which bed comprises a plurality of separate, movable, filter elements 42, such as spherical glass marbles, or other types of elements. The spherical filter elements 42 are supported several layers deep upon a grid structure 44 (FIG. 3) formed of wire mesh or perforated, and the sheet and the mesh, in turn, are supported upon a plurality of spaced-apart, parallel rods 46. The rods extend transversely across the housing section and are supported on the top edges of a plurality of spaced parallel ribs 48 transversely thereof. The ribs are connected at opposite ends to a cylindrical retaining band or ring 50 which extends above the level grid mesh 44 to contain the filter elements thereon.

Scrubbing liquid (normally water) is supplied to wet the surfaces of the filter elements 42 by means of a plurality of spray nozzles 60 disposed below the filter bed 40 and adapted to spray finely divided droplets of scrubbing liquid on the under-side of the filter bed so that the upwardly moving gases and contaminants therein impinge on the liquid film. The contaminants in the gas agglomerate, and collect in the liquid droplets of spray and the liquid film on the surface of filter elements as the gases flow upwardly through the filter bed.

Water or other scrubbing liquid is supplied to spray nozzles 60 through a piping and manifold system 62 at a controlled rate, and when the gases and liquid droplets or spray from the nozzle 60 pass and mix intimately in the many tortuous and devious passages between the filter elements 42 in the filter bed 40, an intense foaming or scrubbing action develops and a foam bed 70 (FIG. 7) or bubble layer is developed in the upper portion and above the filter bed.

When the gas velocity in different areas in the filter bed is nonuniform and varies widely from place to place across the filter bed, it has been found that channeling occurs and little or no foaming action is developed in the regions where the velocity is too high. Without the foaming action and formation of the turbulent bubbling layer, the efficiency of particle removal in the area drops off rapidly because in the foaming or bubble bed formed at the upper portion of the filter bed the greatest exchange of contaminants from the gas to the liquid takes place. This channeling action is visibly observable in a filter bed during operation and appears as an opening or hole formed in the layer of foam above the top layer of filter elements in the filter bed.

In accordance with the present invention, the filter bed 40 can be tilted or angularly adjusted (FIG. 5) relative to the horizontal so that the thickness of the bed or number of layers of filter elements 42 is nonuniform and is deeper at some points than at others (FIG. 5). The thicker or deeper portions of a tilted bed offer the greatest resistance to flow, and the filter bed is tilted so that the high resistance area is located over the region where channeling in the foaming bed 70 was occurring. This action, in effect, blocks off the channeling area and forces the gas flow to be distributed more uniformly over the entire cross section of the filter bed. Consequently, the velocity of gas flow in the channeling region is reduced and the foam bed fills in over the area where channeling previously occurred.

As shown in FIG. 5, it has been found that the buoyant upward forces of the high velocity gases flowing in the housing 12 tend to maintain the upper layer of filter elements in the bed on a horizontal or level regardless of the fact that grid mesh 44 is tilted relative to the horizontal. As shown in FIG. 4, above a right-hand portion of the filter bed 40, the foam bed 70 is discontinuous and channeling is occurring. The filter bed is then tilted relative to the horizontal (FIG. 5) so that the bed is deeper or thicker in this area than on the left-hand side. The channeling action is corrected and the foam layer 70 fills up to a substantially uniform thickness across the entire filter bed 40, as shown in FIG. 5. It has been found that by providing means for tilting or angularly adjusting the filter bed 40 relative to the horizontal, channeling can be eliminated and improved scrubbing efficiency is obtained, even in the most difficult applications where space limitations preclude a uniformly distributed gas velocity into the scrubber housing from the inlet fitting 22. In order to provide for tilting or angular adjustment of the filter bed 40 in the housing 12, a trio of angle brackets 72 are welded or otherwise secured at circumferentially spaced positions to the interior of the housing shell. Each angle bracket includes a horizontal flange and an adjustable setscrew 74 is mounted in a threaded opening provided in the bracket flange. The upper ends of the setscrews 74 are seated in recesses formed in small support plates 76 which are welded or otherwise attached to the underside of the vertical stiffening ribs 48 of the filter bed structure. Each setscrew 74 is independently adjustable to provide the desired tilt or angle of the grid mesh 44 relative to the horizontal. By adjusting and readjusting the tilt of the filter bed grid mesh 44, the channeling action in the foam bed 70 can be minimized and eliminated.

In FIG. 5, the dotted line indicates a true horizontal or level line and, as shown, the individual filter elements 42 in the upper layer of the bed are maintained at a level even though the grid 44 is tilted relative to the horizontal. This results in more layers of the elements being positioned at the right-hand side of the filter bed and greater resistance to flow in this region, so that the gases are diverted and distributed more evenly over the entire bed and the channeling action (as shown in FIG. 4) is eliminated. In order to drain off the contaminated liquid from the bed and maintain the foaming or turbulent layer 70 at a desired upper level, the filter bed is provided with a weir or drain cup 80 having an open upper end and a drainpipe 82 which extends downwardly through the grid mesh 44 below the filter bed. The lower end of the drainpipe 82 is closed with a rubber sock-type valve 84 which opens and closes intermittently to drain off liquid from the bed from time to time when a sufficient liquid head builds up.

After the gases are scrubbed and cleansed in the filter bed 40 and turbulent layer of foam 70, they flow upwardly through a rotary demisting vane assembly 90 (dotted lines, FIG. 1) and are centrifuged outwardly against the inside surface of the housing wall. Any remaining liquid droplets are thrown outwardly of the upwardly spiraling gas stream, and these droplets collect and flow downwardly into an annular collecting trough 92. Collected liquid from the trough 92 is drained through a line 94 having a rubber sock valve 96 on the lower end and spills onto the foam bed 70. The demisting vane assembly 90 is similar in construction and operation to the separator assembly shown in United States Pat. No. 3,348,364, which patent is incorporated herein by reference.

After demisting of the gases in the vane assembly 90, the gases flow upwardly into a plenum chamber 98 at the upper end of the housing section 12. The plenum chamber 98 includes a flanged outlet fitting 98a for connection with an exhaust duct, and fan means (not shown) may be connected to the exhaust duct for moving the gas through the scrubber or, in the alternative, fan means can be used on the inlet side of the scrubber for moving the gas into the inlet fitting 22 and through the system.

From the foregoing, it will be seen that the gas scrubber 10 of the present invention is especially adapted for use in installations where nonuniform gas velocity is present in the inlet fitting 22 because of sharp elbows or the like in the inlet duct leading to the scrubber. By tilting the filter bed 40 relative to the horizontal, the effects of flow channeling in the filter bed and turbulent layer or foam bed 70 is reduced to a minimum or eliminated entirely, and the result is a uniform scrubbing action on the gas across the entire surface area of the filter bed and a resultant higher operating and particle removal efficiency.

Referring now to FIGS. 5-9 of the drawings, therein is illustrated another embodiment of a new and improved wet-type gas scrubber constructed in accordance with the features of the present invention and referred to generally by the reference numeral 110. Like reference numerals with the added prefix "1" will be used to identify parts or components of the scrubber 110, which are identical or substantially the same as similar components in the previous embodiment. Instead of a filter bed 40, as in the previously described embodiment, the gas scrubber 110 employs a circular shaped perforated plate 144, which is adjustably supported within the housing 112 upon a plurality of adjustable support bolts 174. The perforated plate 144 is provided with a plurality of apertures or openings therein through which the wetted gases pass and are accelerated to high velocity. As the wetted gases pass through the perforations in the perforated plate, bubbles are formed and an intense foaming action develops above the plate to form a relatively thick layer or bed of foam. An annular seal 145 of resilient sheet material, such as rubber or the like, is provided around the outer peripheral edge of the perforate plate and is secured thereto by means of a circular clamping ring 147 and a plurality of bolts 149. The outer edge of the resilient seal 145 is secured to the inside surface of the wall of the housing 112 by means of a clamping ring 150 secured in place by a plurality of clamping bolts 151. The resilient seal 145 provides for positive sealing above and below the perforate plate 144 so that all the gas flow is directed through the openings or perforations within the plate without leakage around the outside. The flexible seal also permits tilting adjustment of the perforate plate by adjustment of the leveling screws 174 so that the plate can be deployed in any number of different positions of angular displacement with relation to the horizontal, as indicated in FIG. 9.

In accordance with the present invention, if a nonuniform distribution of gas flow through the foam layer above the perforate plate 144 develops so that an excessively high velocity flow area is formed, for example, adjacent the right hand edge, as shown in FIG. 6, the foaming action is reduced or eliminated entirely in this area and channeling occurs. The gases naturally tend to pass through the area of least resistance in the foam bed and a portion of the gas does not achieve adequate scrubbing action. In order to eliminate this channeling, the perforate plate 144 is tilted relative to the horizontal, as shown in FIG. 9, so that a greater distance between the upper level of the foam layer and the perforate plate is set up in an area where the channeling occurs. The top or upper level of the foam bed generally tends to remain horizontal or level and the foam moves laterally to fill in the area and a thicker bed of foam is developed. The increased thickness of the foam bed in the area where the channeling has occurred offers increased resistance to the flow of gas through the foam and in effect blocks off the high velocity channeling area so that the gas velocity is distributed more uniformly over the entire cross-sectional area of the foam bed. This results in more uniform scrubbing action over the entire cross-sectional area of the foam bed and eliminates the channeling effect caused by uneven velocity distribution.

If the velocity distribution in the lower portion of the housing 112 below the perforated plate 144 is substantially uniform, no tilting of the perforated plate relative to the horizontal may be required. However, in cases wherein the effects of flow channeling are serious enough to reduce the foam layer in a particular zone of the foam bed, the adjusting screws 174 may be manipulated to tilt the plane of the perforated plate 144 until increased thickness of the foam layer occurs over the channeling area and the channeling is thereby eliminated.

While there have been illustrated and described two embodiments of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. A wet-type gas scrubber comprising a housing having an inlet for contaminated gas and an outlet for cleansed gas spaced above said inlet, means for wetting said gas with scrubbing liquid, filter means extending transversely between said inlet and outlet for accelerating said wetted gas to high velocity and forming a layer of liquid foam bubbles across said housing between said inlet and outlet, and filter support means for supporting said filter means and means for tilting said filter means to a plurality of adjustable tilt positions relative to the horizontal forming a nonuniform thickness of said foam layer across said housing and means for maintaining said support means in a selected one of said positions.

2. The scrubber of claim 1 wherein said filter means comprises a filter bed including a grid across said housing and a plurality of separate, movable filter elements several layers deep mounted on said grid and said filter support means includes adjustable support means for supporting said grid in a position tilted relative to the horizontal whereby a nonuniform depth of foam layer is obtained across said plate.

3. The scrubber of claim 1 wherein said filter means comprises a perforated plate having a plurality of apertures therein and said filter support means includes adjustable support means for supporting said plate in a position tilted relative to the horizontal whereby a nonuniform depth of foam layer is obtained across said plate.

4. The scrubber of claim 3 including flexible seal means around the periphery of said plate sealingly secured to the inside surface of said housing.

5. The scrubber of claim 4 including drain means above the level of said perforated plate for limiting the upper level of said foam layer by removal of contaminated liquid.

6. A gas scrubber comprising a housing having an inlet for contaminated gas adjacent the lower end and an outlet for cleansed gas adjacent the upper end, a filter bed across said housing intermediate said inlet and outlet including a supporting grid and frame and a plurality of separate individually discrete, filter elements on said grid relatively movable over said grid stacked several layers deep, and adjustable filter bed support means for supporting said filter bed in said housing, means for tilting said filter bed to a plurality of adjustable tilt positions relative to the horizontal and means for maintaining said support means in a selected one of said positions, said elements movable across said tilted grid toward lower portions thereof forming a nonuniform depth of elements in different portions of said filter bed.

7. The gas scrubber of claim 6 wherein said adjustable support means includes a trio of vertically adjustable support members mounted at spaced locations around the inside of said housing.

8. The gas scrubber of claim 7 wherein said housing includes a cylindrical wall section and said inlet is formed on one side of said wall section and wherein said support means includes a cylindrical ring and a plurality of spaced-apart, vertical ribs across said ring for supporting said grid.

9. The gas scrubber of claim 8 including drain means adjacent the center of said grid for removing liquid from said filter bed and discharging the same into the lower end of said housing and valve means operable to open and close said drain means in response to the head of liquid collected therein.

10. The gas scrubber of claim 8 wherein said trio of adjustable support members are in engagement against said vertical support ribs.

11. The gas scrubber of claim 8 wherein said cylindrical ring extends upwardly above said grid for containing said filter elements around the edge of said filter bed.

* * * * *